Figure 1:
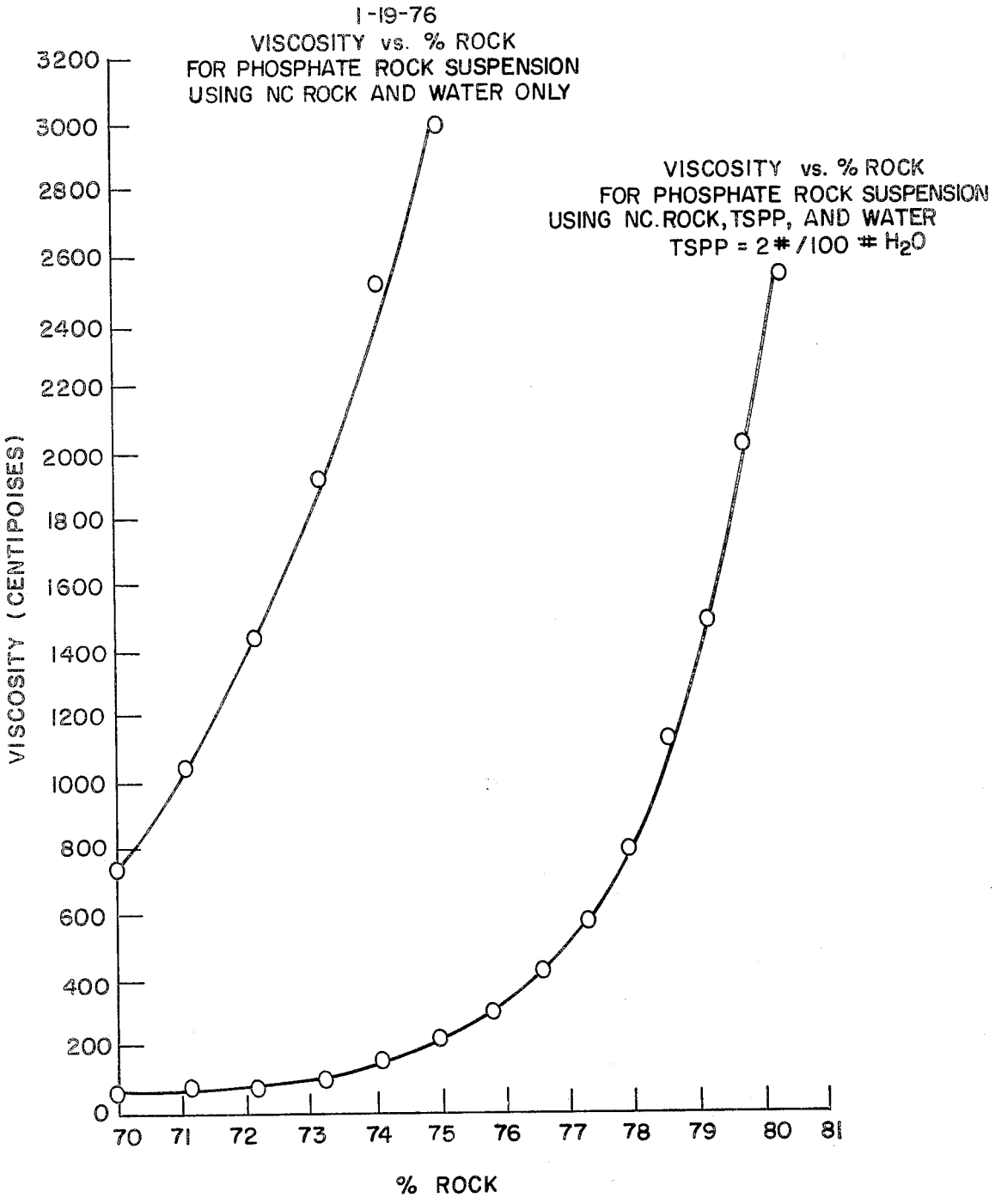
Figure 2:
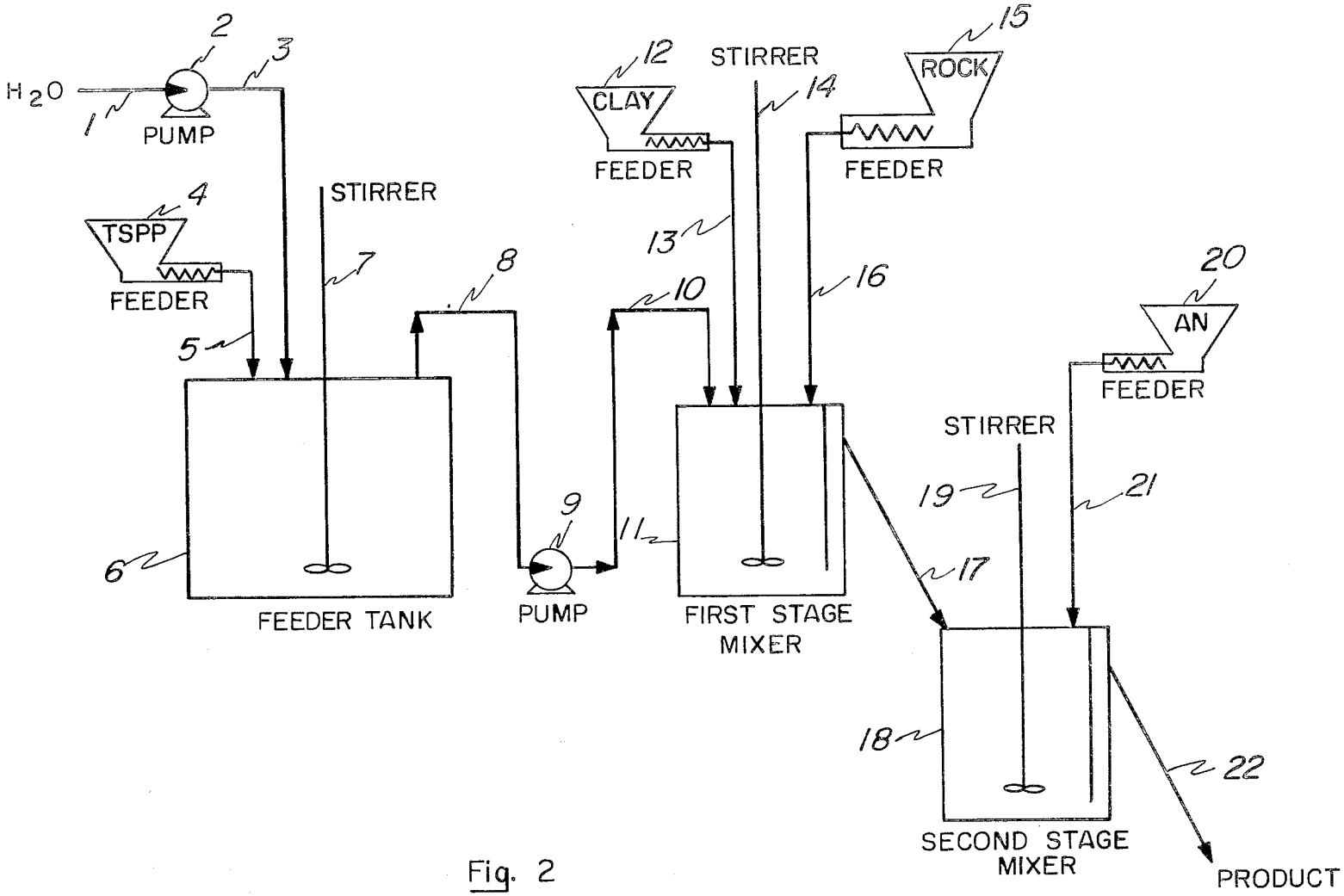

United States Defensive Publication [19] (H) [11] T962,003

Harrison [43] Sept. 6, 1977

[54] CONCENTRATED PHOSPHATE ROCK-WATER SUSPENSION FERTILIZER

[75] Inventor: Cecil P. Harrison, Florence, Ala.

[73] Assignee: Tennessee Valley Authority

[21] Appl. No.: 728,304

[22] Filed: Sept. 30, 1976

[51] Int. Cl.[2] ..... C05B 13/02

[52] U.S. Cl. ..... 71/33; 71/64 C

[57] ABSTRACT

Processes for preparing concentrated phosphate rock-water suspension fertilizer with exceptionally satisfactory handling and storage properties are disclosed. Although there are various parameters in the processes that can be varied, they may, for the sake of convenience, be categorized in two embodiments. In the first embodiment, the process involves the blending together of water, fine-ground phosphate rock, and a small amount of a particle dispersant in proportions so that the final product contains 70–78 percent by weight of phosphate rock. In the second embodiment, the process involves the use of specialized procedures in the blending of water, fine-ground phosphate rock, gelling-type clay, and small amounts of dispersant and gelling agents in preparation of final product suspension containing 60 percent by weight of phosphate rock.

15 Claims, 2 Sheets Drawing,

16 Pages Specification

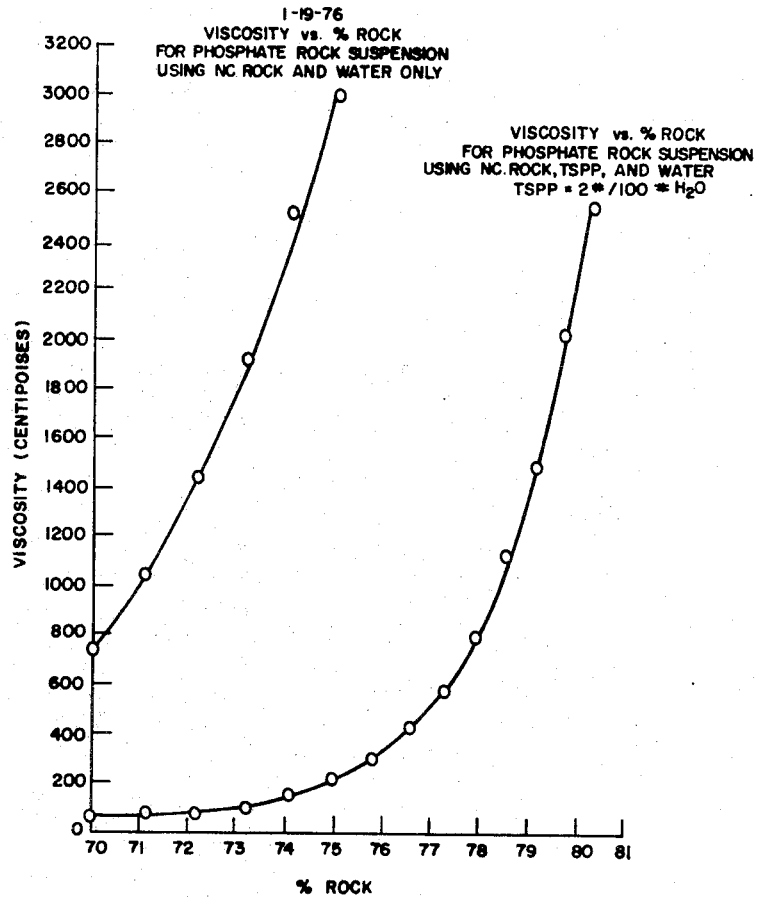

The file of this unexamined application may be inspected and copies thereof may be purchased (849 O.G. 1221, Apr. 9, 1968).